Jan. 6, 1959 J. H. MacNEILL ET AL 2,867,789

MERCURY MEMORY TANK

Filed April 28, 1955 3 Sheets-Sheet 1

INVENTORS.
JOHN H. MAC NEILL
CHARLES F. WEST
BY Wade Koontz
ATTORNEY and
James S. Shannon
AGENT INVENTORS.
JOHN H. MAC NEILL
CHARLES F. WEST
BY Wade Koontz
ATTORNEY and
James S. Shannon
AGENT Jan. 6, 1959 J. H. MacNEILL ET AL 2,867,789

MERCURY MEMORY TANK

Filed April 28, 1955 3 Sheets-Sheet 3

INVENTORS.
JOHN H. MAC NEILL
CHARLES F. WEST
BY Wade Koontz
ATTORNEY and
James S. Shannon
AGENT United States Patent Office 2,867,789

Patented Jan. 6, 1959

2,867,789

MERCURY MEMORY TANK

John H. MacNeill and Charles F. West, Melbourne, Fla., assignors to the United States of America as represented by the Secretary of the Air Force Application April 28, 1955, Serial No. 504,701

3 Claims. (Cl. 340—173)

(Granted under Title 35, U. S. Code (1952), sec. 266)

The invention described herein may be manufactured and used by or for the United States Government for governmental purposes without payment to us of any royalty thereon.

This invention relates to memory or storage devices for use in digital computing systems. More specifically, the invention relates to memory devices of the electro-acoustic mercury delay line type and particularly to the design of the mercury tank in such a device.

In general, memory devices of the above type provide a plurality of delay loops around each of which stored digital information circulates until it is erased or replaced by different information. The mercury, confined in a suitable container or tank, provides a plurality of acoustic delay paths each terminated at its input and output ends by electro-acoustic transducers. The output transducer of each delay path is coupled back to the input transducer so as to provide a closed loop. This external circuit includes a recirculating amplifier and any additional circuits, such as timing and reshaping circuits, that may be required. The external circuit of each loop also contains gating circuits for reading into, reading out of and clearing the loop. Digital information is read into and out of the loops as high frequency electric energy in serial pulse form but traverses the mercury delay paths as pulsed acoustic energy, the transitions between the two forms of energy being accomplished by the input and output transducers associated with each delay path. The storage capacity of each loop is determined by the lengths of the delay path, the pulse separation and the acoustic velocity in the delay medium, in this case mercury. Since the velocity of an acoustic wave is a function of the density of the propagating medium which in turn is a function of its temperature, precise control of the mercury temperature is required to assure a constant delay.

The principal objects of the invention are to provide a mercury memory tank having a low ratio of volume to stored information and having a physical form and arrangement of parts that facilitates maintenance of the mercury temperature within close limits. Further objects of the invention are the provision of a mercury memory tank in which the high frequency connections between the external recirculaitng and gating circuits and the acoustic delay channels are short and of equal lengths in the various channels so as to provide a high degree of uniformity between the channels, in which the construction is rugged and able to withstand considerable shock without damage or effect on performance, in which contamination of the mercury through contact with other metals is prevented, and in which easily machined shapes are employed to permit economy in construction.

Briefly, the principal objects of the invention are realized as follows: A low ratio of volume to stored information for the tank is achieved through utilizing a cylindrical mercury volume of substantially equal length and diameter which is bounded at opposite ends by flat parallel reflecting plates. Transducers are mounted in the reflecting plates at the proper angle to give the number of acoustic reflections between the plates required to provide the desired length of delay path. The transducers are so arranged that one half of the delay paths lie in one set of parallel equally spaced planes and the other half lie in a second set of parallel equally spaced planes at right angles to the first set, both sets being normal to the reflecting plates. In this manner a high degree of utilization of the mercury for propagating acoustic waves is attained. For precise temperature control, the main body of the tank is made heavy and of metal having high heat conductivity. This reduces unevenness in the temperature of the body and provides good heat conductivity between heater plates containing electric heating elements and located at either end of the main body. Sensitive thermostats controlling the heating elements are located outside the heater plates. This arrangement allows rapid cooling of the thermostats and, therefore, rapid thermal cycling which results in better smoothing of the temperature fluctuations.

A more detailed description of the invention will be made in connection with the specific embodiment thereof shown in the accompanying drawings, in which.

Figures 1, 2:
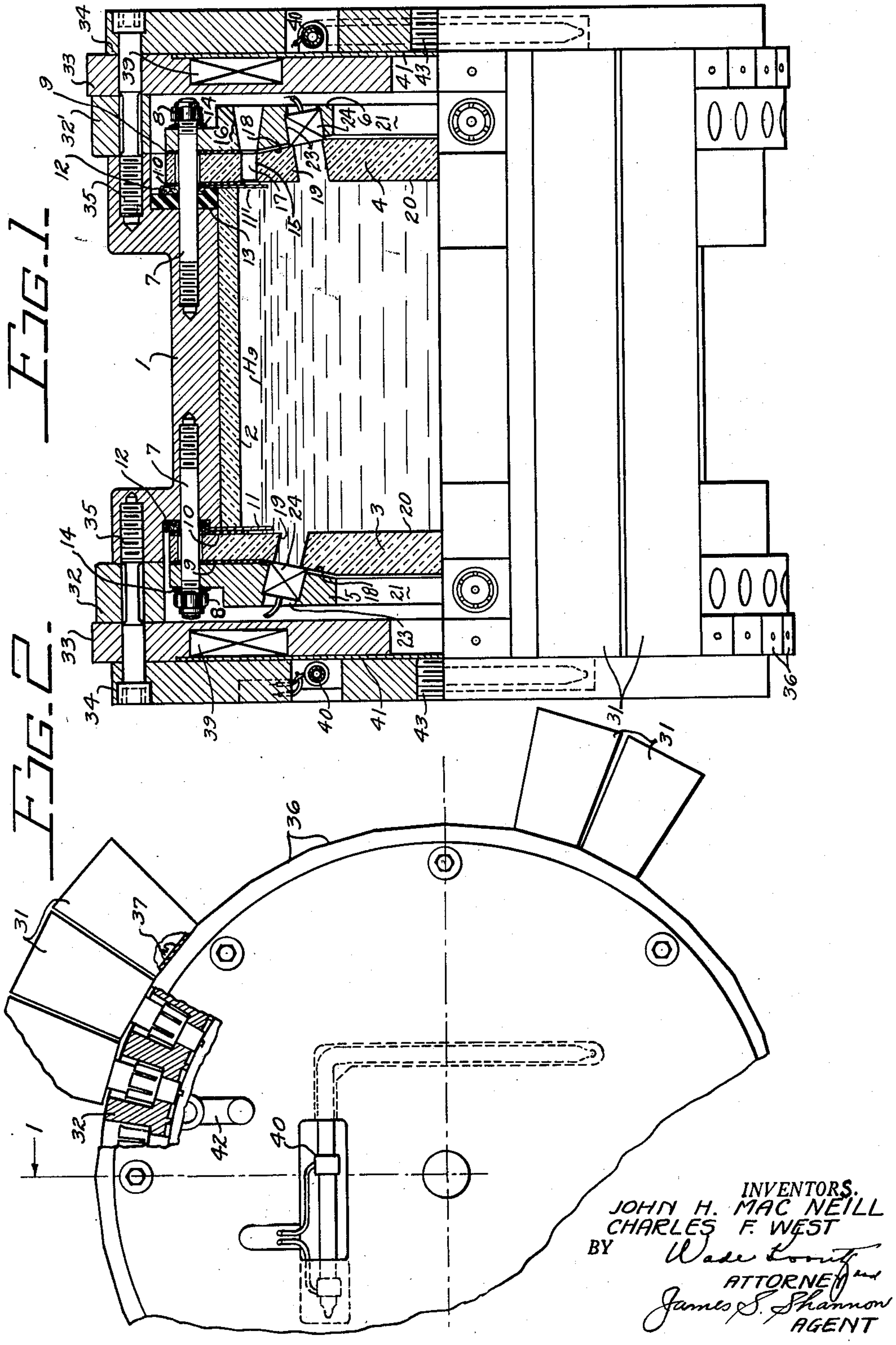
Fig. 1 is a partly sectional view of the assembled mercury memory tank.
Fig. 2 is an end view of assembled tank.

The specific embodiment of the mercury memory tank shown in the drawings provides thirty-two acoustic delay paths. Referring to Figs. 1 and 2, the main body 1 of the tank is in the form of a flanged hollow cylinder made of metal having high heat conductivity, such as aluminum. A generous amount of metal is utilized in the main body in order to provide a high degree of heat transferring ability. The main body 1 contains an accurately fitted glass liner 2. The ends of the glass liner are closed by end plates 3 and 4 also made of glass. The end plates are backed by transducer retaining plates 5 and 6. The end plates and transducer retaining plates are held in alignment by dowel pins (not shown) supported by the main body 1 and are attached to the main body by a plurality of stud bolts 7 and friction lock nuts 8. Shims 9, made of a suitable material, such as a plastic material commercially known as Teflon, are situated between plates 5—3 and 6—4. Similar shims 10 are situated between end plates 3 and 4 and the glass liner 2. Also located between end plates 3 and 4 and the glass liner are grounding rings 11 and 11′ made of a suitable metal foil such as molybdenum foil. A good electrical contact to the foil is effected by metallic mesh 12 made of a non-corrosive metal such as stainless steel. Provisions are made to insulate grounding ring 11′ from the tank body. This is accomplished by insulating spacer 13, by sufficiently large openings in foil 11′ to avoid contact with bolts 7 and by locating the mesh 12 between bolts 7 and out of contact therewith. The pressure exerted on the stacked end and transducer retaining plates by bolts 7 is regulated by Belleville washers 14. The tank is filled through openings 15 and 16 in plates 4 and 6, opening 15 being sealed by glass plug 17 after filling.

Figure 3:
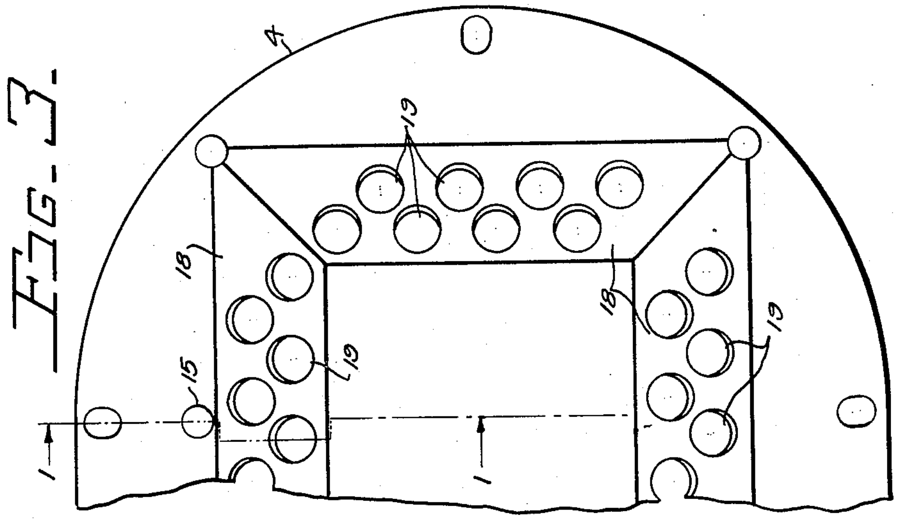
Fig. 3 is a view of the glass end plates.

Except for minor differences, such as the above filler openings, the end plates 3 and 4 and the transducer retaining plates 5 and 6 are identical. The outer face of glass end plate 4, or the face opposite to that in contact with the mercury, is shown in Fig. 3. This face has a central portion in the form of four-sided equilateral truncated pyramid having identical side surfaces 18. As may be seen in Fig. 1, the sides of the base of this pyramid are approximately equal to the inner diameter of the mercury tank in order that the openings of passageways 19 in the surfaces 20 be located as near the outer edge of the volume of mercury as possible. There are thirty-two circular passageways 19 through the plate 4, each of the four surfaces 18 containing one fourth or eight of these passageways, the axes of the passageways being normal to the surfaces 18. The passageways have a staggered arrangement pattern in the surfaces 18 as shown in Fig. 3. As is apparent from this figure, the patterns, as viewed from the center of the plate, are identical in opposite surfaces 18 and reversed in adjacent surfaces 18. The inner surfaces 20 of the end plates 3 and 4 should be flat and, at least in the square area bounded by passageways 19, the flatness should be within two bands of helium light per inch. The surfaces 20 may be lightly etched if desired to obtain a mismatch between the mercury and the glass in order to produce good reflections of the acoustic waves which, as will be seen later, strike these surfaces.

Figures 4, 5:
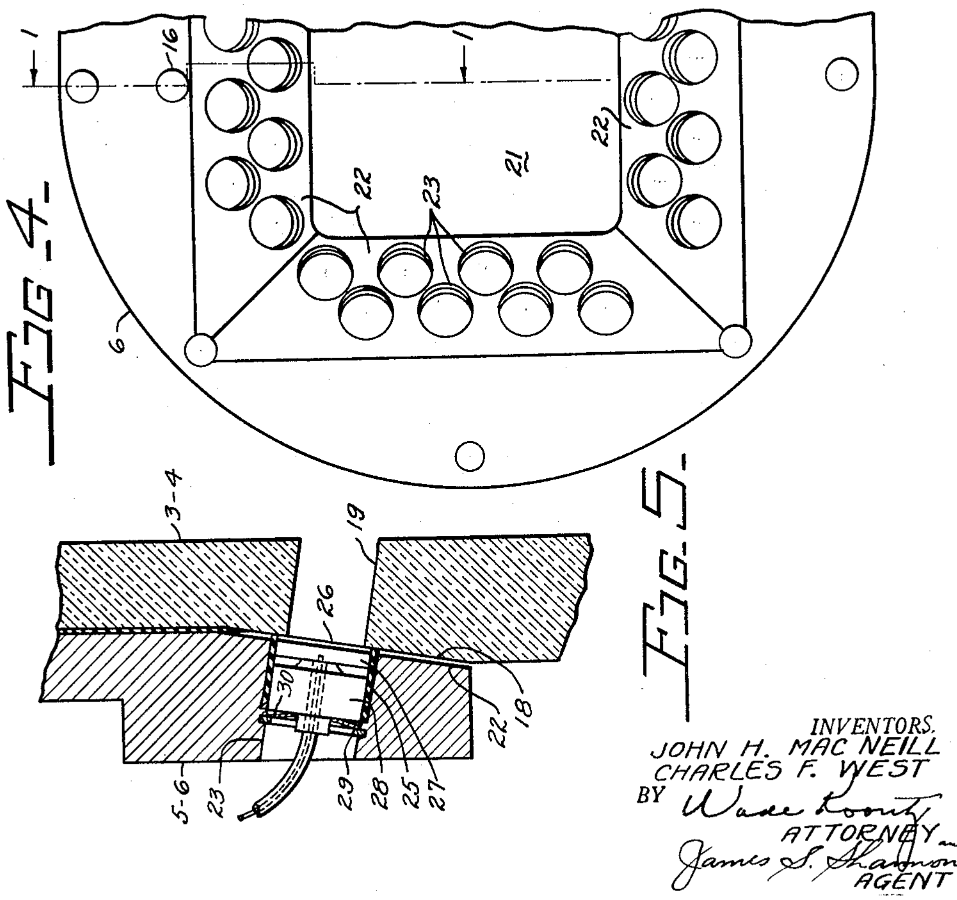
Fig. 4 shows the construction of the transducer retainer plates.
Fig. 5 illustrates the details of a transducer.

The inner face of transducer retainer plate 6, or the face that is adjacent to the outer face of glass end plate 4 in the tank assembly (Fig. 1), is shown in Fig. 4. The transducer retainer plate is made of a suitable metal such as stainless steel and, as seen in Figs. 1 and 4, has a square opening 21 in the center. Bounding this opening are four inclined flat surfaces 22 which, when the plates 4 and 6 are assembled, are parallel to and closely adjacent to surfaces 18 of plate 4. The surfaces 22 each contain eight passageways 23 in the same pattern as the passageways 19 in the corresponding surfaces 18 of end plate 4. These passageways are of slightly greater diameter than passageways 19 and their axes coincide with the axes of passageways 19 in plate 4 when the two plates are assembled. Transducer retainer plate 5 is similar to plate 6. The purpose of the two plates is to support transducers 24 against the openings of passageways 19 in the glass end plates 3 and 4.

The transducers 24 are all identical and their details are shown in Fig. 5. The passageway 23 has an enlarged portion in the end nearest the glass end plates 3 and 4 which receives an insulating sleeve 25. Within the sleeve 25 are situated a piezoelectric disc 26, a metallic electrode 27 and an insulating spacer 28. The assembly is retained in the opening 23 by means of snap ring 29 and Belleville washer 30 which governs the pressure of electrode 27 against the piezoelectric disc 26. An insulated high frequency lead passes through spacer 28 to the electrode 27. The mercury in the tank fills passageway 19 and is in contact with and forms the inner electrode for disc 26.

Figure 6:
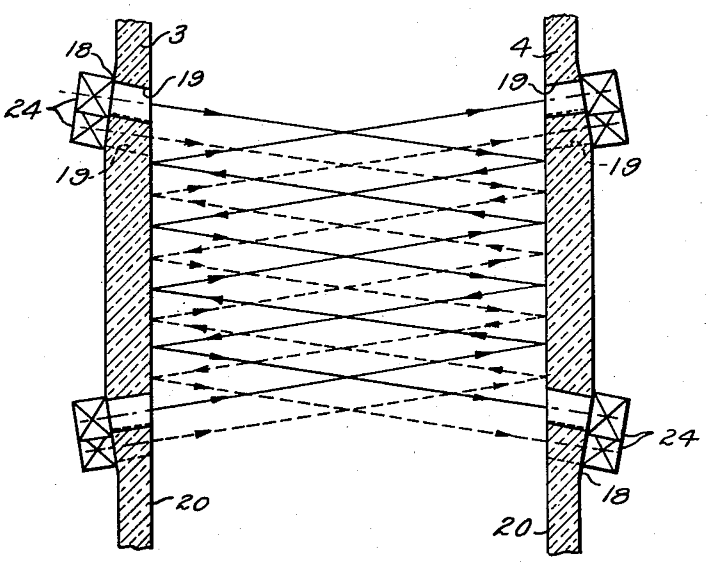
Fig. 6 shows the acoustic path pattern within the tank.

As previously indicated, end plates 3 and 4 are identical as to the location of passageways 19. It will be apparent from an inspection of Fig. 3 that if plates 3 and 4 are placed together with their inner faces 20 in contact it will be possible to orient the plates so that the openings of passageways 19 in the two surfaces 20 coincide. This occurs when one of the plates is rotated 90° from the position shown in Fig. 3. The plates are assembled to the tank main body with this 90° orientation, and when so oriented it is apparent that the arrangement of the openings of passageways 19 in the inner face 20 of each plate is the mirror image of the arrangement of openings in the inner surface of the other plate. With this arrangement, eight equally spaced vertical planes and eight equally spaced horizontal planes, assuming the tank position of Fig. 1, will include the axes of all sixty-four passageways 19, each plane containing the axes of four passageways. A section taken along one of these planes is shown in Fig. 6 which also shows in solid lines the two acoustic paths between the four transducers associated with the plane. The two acoustic paths associated with the next adjacent plane are shown in dotted lines. With two acoustic paths centered in each of the sixteen planes a total of thirty-two paths are provided.

Figure 7:
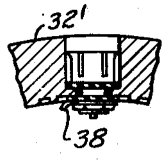
Fig. 7 shows details of one of the R. F. connector rings.

The remaining structure of the tank is concerned with temperature control and with providing support for and electrical connections to the thirty-two external recirculating circuits coupled between the output and input transducers of the thirty-two acoustic paths. The recirculating circuits, which as already stated may comprise amplifier, timing, reshaping and gating circuits, are contained in chassis 31 several of which are shown in position in Figs. 1 and 2. R. F. connector rings 32—32′ and heater plates 33, which together with thermostat plates 34 are attached to the main body of the tank by screws 35, are involved in supporting and providing high frequency connections to the chassis 31. Heater plates 33 each have thirty-two flats 36 milled in their rims so as to provide seats for the chassis 31. The chassis are held against their seats by screws, such as screw 37 shown in a partially cut away chassis in Fig. 2, or in any other suitable manner. The end view of the tank in Fig. 2 is cut away to the center of R. F. connector ring 32 for a short distance to show the high frequency coaxial connectors which complete high frequency circuits to the chassis 31. Suitable insulated leads are used to connect the center conductors of the high frequency connectors to the transducers 24. Connector ring 32′ differs slightly from ring 32 in that it has a greater internal diameter to allow space for properly insulating the mesh 12 and floating ground ring 11′ from the main body of the tank, and in that the outer conductors of the high frequency connectors are insulated from the connector ring. These details are shown in Fig. 7. The outer conductors are connected in this case through lugs 38 to mesh 12 and thence to floating ground ring 11′.

The temperature of the mercury tank is controlled by ring heater elements 39 imbedded in heater plates 33, which are made of a metal of high heat conductivity such as aluminum. Connector rings 32 and 32′ are also made of aluminum so that a good heat path is provided from the ring heaters 39 to the main body of the tank. Each of the end plates 34, which may be made of aluminum, has imbedded therein a sensitive thermostat 40 which controls its adjacent ring heater. The heater elements are separated from the thermostats by radiation shields 41 which may also be made of aluminum. As a safety device, over-temperature thermostats may be located in the thermostat plates 34, as at recess 42, for removing voltage from both heater rings should the temperature for any reason exceed a pre-established maximum. The main body portion 1 is made heavy, as already pointed out, to promote rapid heat transfer and uniform temperature throughout. The main body may be insulated if desired; however, the thermostat plates 34 should be left exposed to allow rapid cooling in the vicinity of the thermostats. This results in rapid thermal cycling and better smoothing of temperature fluctuations. A tank of the described type may have a thermal time constant of the order of ten minutes.

The tank is mounted horizontally by shock mounts screwed into threaded openings 43 at the center of plates 34. The dimensions of the tank are normally such that it may be easily mounted in a standard relay rack. For example, if the delay in each acoustic path of the above described tank is set at 384 microseconds (approximately 22 inches) the overall length in the tank is approximately 8 inches and the maximum diameter, not including the recirculating chassis, is also approximately 8 inches. The storage capacity of such a tank for 48-bit words and 1 microsecond pulse spacing is 256 words for single channel operation of each delay path. With 4-channel operation of the delay paths, which may be achieved by ¼ microsecond phasing of the channels, the capacity can be increased to 1,024 words. Suitable frequencies for the memory are a 20–30 megacycle carrier modulated by pulses of 4 megacycle energy.

The specific design features of the above-described embodiment, such as number of delay channels, number of reflections per delay channel, etc., are intended to be illustrative only since these parameters may be changed as required without departing from the principles of the invention.

We claim:

1. A mercury memory tank comprising a hollow cylindrical main body, end plates closing the ends of said main body to form a cylindrical cavity, the inner faces of said end plates being flat and parallel to each other, the outer faces of said end plates having identical centrally located raised portions in the form of truncated four-sided equilateral pyramids having base sides approximately equal to the diameter of said cylindrical cavity, a plurality of passageways having axes normal to the sides of said pyramids extending from said pyramid sides to said inner surfaces, the openings to the passageways in each of said pyramid sides being arranged in evenly staggered inner and outer rows such that the axes of each passageway located in an outer row of each end plate lies in a plane that is normal to the inner faces of said end plates and contains the axis of a passageway in the other end plate located in an inner row, a plurality of electro-acoustic transducers equal in number to the number of passageways, a pair of transducer retainer plates each attached to said main body and positioned adjacent to the outer faces of said end plates, said transducer retainer plates holding said transducers in contact with said pyramid sides so that each covers one of the passageway openings in said pyramid sides, said cylindrical cavity and said passageways being filled with mercury, said main body being made of metal and having a glass liner, said end plates being made of glass, and a grounding ring of metal foil located between each end plate and said liner and extending into said mercury.

2. Apparatus as claimed in claim 1 in which one of said grounding rings makes electrical contact with said main body and the other is insulated from said main body.

3. A mercury memory tank comprising a hollow cylindrical main body, end plates closing the ends of said main body to form a cylindrical cavity, the inner faces of said end plates being flat and parallel to each other, the outer faces of said end plates having identical centrally located raised portions in the form of truncated four-sided equilateral pyramids having base sides approximately equal to the diameter of said cylindrical cavity, a plurality of passageways having axes normal to the sides of said pyramids extending from said pyramid sides to said inner surfaces, the openings to the passageways in each of said pyramid sides being arranged in evenly staggered inner and outer rows such that the axes of each passageway located in an outer row of each end plate lies in a plane that is normal to the inner faces of said end plates and contains the axis of a passageway in the other end plate located in an inner row, a plurality of electro-acoustic transducers equal in number to the number of passageways, a pair of transducer retainer plates each attached to said main body and positioned adjacent to the outer faces of said end plates, said transducer retainer plates holding said transducers in contact with said pyramid sides so that each covers one of the passageway openings in said pyramid sides, said cylindrical cavity and said passageways being filled with mercury, said main body being made of metal having good heat conductivity, a heater plate attached to each end of said main body outside said transducer retainer plate, a thermostat plate supported in contact with the outside of each heater plate, each heater plate having an electric heating element controlled by a thermostat in the adjacent thermostat plate, a plurality of recirculating chassis equal in number to the number of transducers associated with each end plate, means for mounting said chassis longitudinally of said tank and around its circumference, connector rings of metal located between the main body and said heater plates, said connector rings carrying high frequency connectors which mate with high frequency connectors on said chassis and which are connected to said transducers.

References Cited in the file of this patent

UNITED STATES PATENTS

| | | |
|---|---|---|
| 2,423,306 | Forbes et al. | July 1, 1947 |
| 2,434,255 | Bond et al. | Jan. 13, 1948 |
| 2,685,067 | Beveridge et al. | July 27, 1954 |
| 2,826,745 | Page | Mar. 11, 1958 |